June 7, 1932. J. R. OISHEI 1,862,095
MIRROR AND METHOD OF MAKING SAME
Filed Feb. 24, 1930
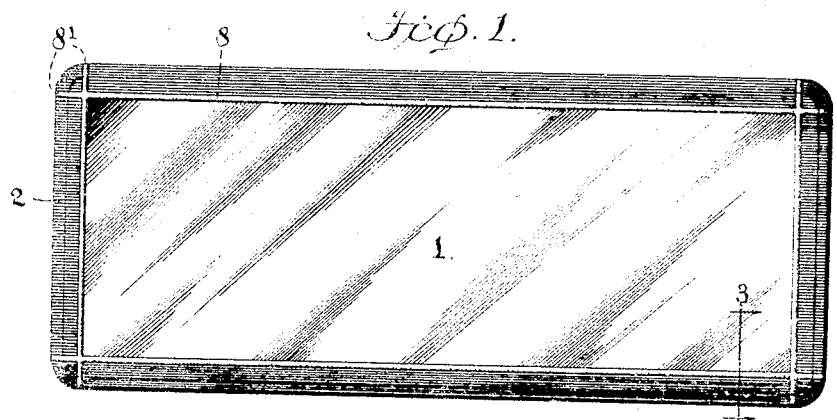
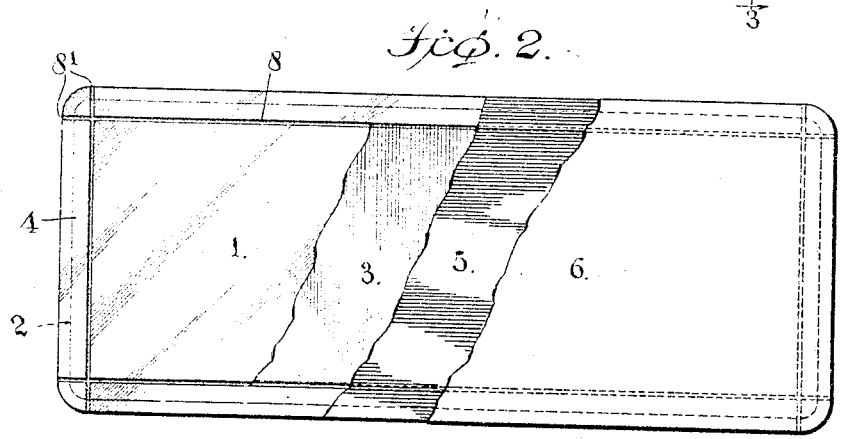
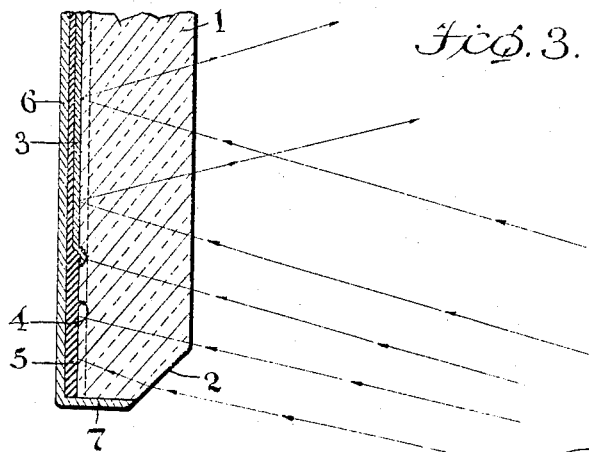
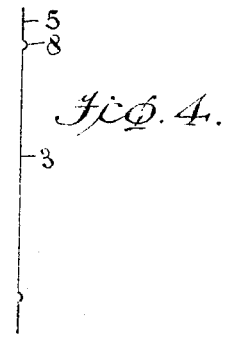
Inventor
John R. Oishei,
By Barton A. Bean Jr.
Attorney Patented June 7, 1932

1,862,095

UNITED STATES PATENT OFFICE

JOHN R. OISHEI, OF BUFFALO, NEW YORK, ASSIGNOR TO TRICO PRODUCTS CORPORATION, OF BUFFALO, NEW YORK

MIRROR AND METHOD OF MAKING SAME

Application filed February 24, 1930. Serial No. 430,939.

This invention relates to certain new and useful improvements in a rear view mirror for motor vehicles whereby traffic conditions to the rear may readily be ascertained.

The usual rear view mirror, especially that positioned above the windshield in the interior of the car, embodies a non-framed plate of glass silvered on its entire back, making the reflecting field coextensive with the body, so that the image reflected by the mirror frequently extends to the extreme edge thereof without any definite line of demarcation or framing to set it off from the interior finish of the motor vehicle or from those objects to the rear of the mirror which might be gathered in by the observing eye. In other words, the reflective field of vision is not accentuated or brought out with such vividness as to enable the observing eye at a glance to focus itself into that particular area to the exclusion of any distracting light rays from adjacent objects. Furthermore, the prevailing type of rear view mirror embodies a marginal bevel which overlies the silvered backing and which reflects and refracts the light ray from such silvered backing so as to present about the reflective field, or along certain margins thereof, a brilliant border in glaring contrast to the reflective area with a resultant dimming of the image reflection from such area. Also the beveled margin tends to refract light rays down onto the silvered backing which in itself is reflected back to the eye with more or less obscuring effect.

The present invention has for its primary object to provide an improved mirror which will overcome the obscureness and other disadvantages of the usual mirror, wherein the reflecting field is coextensive with the body dimensions of the plate of glass, and to provide an improved mirror which will reflect images in a clearer and more distinct manner, and further to provide a mirror with a marginal framing which will avoid the brilliant, vision obscuring refraction and reflection of any light rays therethrough which will glare in vivid contrast to the silvered backing of the reflective area to the dimming of images therein. The invention further resides in the method of framing such reflective area and whereby the framing may be expeditiously carried out in practice.

In the drawing:

Fig. 1 illustrates in front elevation a mirror embodying the present invention.

Fig. 2 is a rear elevation of the mirror with portions of the coatings progressively removed in a manner to more clearly illustrate the invention.

Fig. 3 is an enlarged sectional view on about line 3—3 of Fig. 1.

Fig. 4 is a diagrammatical illustration of the reflective surface and its border.

Referring more in detail to the accompanying drawing, the numeral 1 designates the glass plate body of the mirror having its marginal portion of the front face preferably finished off with a bevel 2. To the rear face of the glass body is provided a reflective coating, such as the usual silver coating, to form the reflective field 3. The back surface of the glass is substantially flat throughout, and the reflective coating terminates short of the edges of the glass body so as to provide a marginal portion generally indicated by the numeral 4. The depth of the margin 4 is greater than the depth of the bevel in the preferred embodiment, and such marginal portion 4 is provided with a coating or backing 5 of a non-reflecting color which readily presents a contrast to the enclosed reflective area 3. Any color may be given the marginal coating 5 although the darker shades, including black, are preferred by reason of their greater contrast with the reflective field 3. A protective coating 6 is provided over the coatings 3 and 5, and for ease in manufacture the coating 5 may extend over the coating 3 more or less fully. The coating 6 may also be extended up over the side faces of the glass, as indicated at 7, extending substantially to the base of the bevel 2. The provision of the colored margin 5 absorbs to a practical extent the light rays which enter through the sides of the glass body, the bevel 2, and even the marginal portions of the front face, and thereby avoids reflection of such rays in a manner which will confuse or obscure the reflected image. By giving a depth to the margin 4 greater than that of the bevel 2, or, in other words, by extending the colored margin 4 inwardly beyond the bevel any light rays passing through the front face of the glass and onto the marginal portion will be substantially absorbed thereby.

The invention further resides in the provision of a border for the reflective field 3 which will serve as a definite setting off of the field or as giving depth thereto relative to the margin 5. In carrying this into practice it is preferred to provide the back surface of the glass with a groove 8 separating the margin from the enclosed reflective field, the groove extending substantially parallel with the adjacent edge of the body and may be coextensive therewith, intersecting the grooves of the adjacent edges as well as the margins as indicated by the extensions 8'. The wall portions of these grooves have a rough finish in contrast to the polished back surface of the glass body and are designed to receive a portion of the silver coating which, shining through the unpolished wall portions of the grooves, casts a subdued or frosted border standing out in vivid contrast not only to the colored margin but also to the silvered reflective field. The extensions 8', extending across the colored margin, serve to readily locate and emphasize the border or line 8 of demarcation between the reflective field and the colored margin. Increasing the depth of the groove brings the subdued border closer to the front face of the glass, giving a relative depth to the reflective field, and acting as a barrier thereabout in obstructing certain of the lateral light rays against entering through the adjacent bevel and marginal edge portion of the body. The back surface of the glass will thus present a reflective field surrounded by a raised border 8 and a non-reflecting margin, as diagrammatically indicated in Fig. 4, the raised border or ridge being in contrast with the margin and both being substantially non-reflective.

The method of coating the body simplifies the manufacture of the improved mirror and consists of applying the silver coating to the entire back surface of the glass, whereby the groove 8 as well as the margins 4 are silvered together with the surface portion included by the grooves. The silver coating is next removed from the margins 4 so as to render the latter fully transparent. The coating is left intact within the grooves 8 and their extensions 8' and also within the enclosed area which constitutes the reflecting field. The colored coating is then applied to the margins 4 and finally the protective coating 6 is applied. The grooves provide depressions over which the tool may operate while acting on the margins without coming into contact with the wall portions of the grooves. During this operation the grooves space the margins from the field portion and therefore serve as means to guard against the tool overlapping and removing portions of the reflective field.

What is claimed is:

1. The method of forming mirrors consisting in defining a reflective field with a groove in the back surface of the glass body, applying a reflective coating to the field and groove and framing the marginal portions of the glass body outside of the defining groove by applying a colored coating thereto.

2. The method of forming mirrors consisting in providing a groove in the polished back surface of the glass body to define a reflective field and separated margins, applying a reflective coating to the field and groove, and applying a colored coating to the margins to frame the field, the wall portions of the groove being unpolished whereby a relatively subdued line of demarcation is provided about the reflecting field to border the same.

3. A rear view mirror for motor vehicles comprising a glass body having a reflective field enclosed by a colored margin, and a defining subdued grooved border separating the reflective field from the colored margin.

4. A rear view mirror for motor vehicles comprising a glass body having on its back face a reflective field enclosed by a colored margin, and a defining border of a subdued contrast separating the reflective field from the colored margin, said border extending forwardly from the reflective field and into the body.

5. A glass mirror having a reflective field bordered by a groove formed in the back surface of the glass, the wall portions of the groove possessing a rough finish and coated with the reflective coating of the field, said rough finish of the groove wall portions rendering that portion of the coating within the groove non-reflective in contrast with the reflective field whereby the latter is given a raised defining border.

6. The method of forming mirrors, comprising the steps of grooving the polished back face of a glass plate body to define a reflective field framed by marginal portions, and providing the field and grooved portion with a reflective coat and the marginal portions with a relatively subdued coat.

7. The method of forming mirrors comprising the steps of grooving the polished back face of a mirror to define a reflective field and a margin spaced therefrom by the groove, coating the entire face including the margin and groove with a reflective coat, next removing the coat from the margin, and then providing a backing for the margin.

8. A glass mirror having a reflective field bordered by a groove formed in the back surface of the glass, the wall portions of the groove possessing a rough finish and coated with the reflective coating of the field, said groove defining the field from marginal portions, and a backing for the marginal portions in contrast with the field.

JOHN R. OISHEI.